Patented Apr. 30, 1946

2,399,488

UNITED STATES PATENT OFFICE 2,399,488

HALOGENATION OF UNSATURATED ORGANIC COMPOUNDS

George W. Hearne, Berkeley, Calif., assignor to Shell Development Company, San Francisco, Calif., a corporation of Delaware No Drawing. Application May 29, 1941, Serial No. 395,840

12 Claims. (Cl. 260—659)

This invention relates to the halogenation of unsaturated organic compounds, and more particularly to improvements in the chlorination or bromination, via addition, of unsaturated aliphatic and/or alicyclic hydrocarbons and/or of partially halogenated derivatives thereof. The invention is also directed to improved and novel halogen-yielding compositions or composite reagents which may be used as the source of the free halogen.

It is known that olefins, such as ethylene, propylene, butylenes, and the like, may be chlorinated, via addition, by reacting the olefins with chlorides of metals possessing variable valencies. During this treatment, the metal chloride is reduced to a lower state of valence (for example, cupric chloride to cuprous chloride), thereby yielding chlorine atoms which saturate the double bond or bonds of the olefins. The reduced metal chloride may be regenerated, i. e. oxidized, by reacting it with hydrogen chloride and an oxygen-containing gas such as air, this oxidation step being effected either simultaneously with the olefin chlorination step, or intermittently therewith.

Although the reducible metal chloride, i. e. the chloride of a metal having a variable valence, such as cupric chloride, may be used as such in the olefin chlorination reactions, the prior art discloses that it is preferable to dispose the metal chloride on a carrier of the type of asbestos, pumice or clay. It has been discovered, however, that the use of such compositions or composite reagents as the source of free chlorine results in relatively low yields of the desired products of chlor-addition, requires the use of excessively high reaction temperatures, and forms reaction mixtures containing excessive amounts of undesirable by-products of the type of products of olefin decomposition and chlor-substitution products.

An object of the invention is to provide an improved process which will avoid the above and other defects. Another object is to provide an improved, practical and economical process for the chlorination and/or bromination, via addition, of unsaturated aliphatic and alicyclic hydrocarbons and partially halogenated derivatives thereof. A particular object is to provide a more advantageous process whereby such unsaturated organic compounds may be chlorinated or brominated via addition by reacting them with certain metal chlorides or bromides possessing variable valencies, the reaction being effected under such conditions that the metal halide is reduced to a lower valence and thereby yields halogen atoms to the unsaturated compound treated. A still further object is to provide a continuous or intermittent process wherein an unsaturated organic compound may be halogenated, via addition, by contacting it with improved compositions of matter containing certain metal halides under halogenating conditions, thereby reducing the metal halide, and continuously or intermittently regenerating the metal halide by oxidizing the same to its higher degree of valence. Another object is to provide novel compositions of matter which contain a chloride or bromide of a metal possessing a variable valence, these compositions of matter being adapted to be used as a source of the chlorine or bromine, and, when contacted with unsaturated organic compounds of the group described herein, permitting an efficient halogenation of these unsaturates via addition at relatively lower temperatures and without excessive formation of undesirable by-products. Other objects of the invention will be apparent from the following description of the process.

The unsaturated organic compounds which may be halogenated, i. e. chlorinated or brominated, according to the process of the present invention include hydrocarbons which contain one or more olefinic and/or acetylenic linkages between non-tertiary carbon atoms. Examples of such hydrocarbons are ethylene, propylene, butene-1, butene-2, pentene-1, pentene-2, 3-methyl-butene-1, 1-methyl-butene-2, 2-methyl-butene-3, hexene-1, hexene-2, 4-methyl-pentene-1, 3,3-dimethyl-butene-1, 4-methyl-penten-2, octene-1, cyclopentene, cyclohexene, 3-methyl-cyclo-hexene, butadiene-1,3, pentadiene-1,3, pentadiene-1,4, hexadiene-1,4, hexadiene-1,3, actylene, propyne, butyne-1, pentyne-2, hexyne-1, etc., and their homologues and analogues. The above compounds and their various homologues may be substituted in the nucleus and/or in the substituents in various degrees by straight-chain, alicyclic and/or heterocyclic radicals. Halogenated unsaturated organic compounds containing one or more halogen (i. e. chlorine, bromine, iodine and/or fluorine) atoms and one or more olefinic and/or acetylenic linkages, may also be chlorinated or brominated according to this process. Examples of such halogenated hydrocarbons are: vinyl halides, allyl halides, 2-halo-propylene, crotyl halides, isocrotyl halides, 4-halo-butene-1, methallyl halides, 2-halo-butene-2, monohalogenated acetylenes, propargyl halides, 1,1-dihalo-ethylene, 3-halo-pentene-1, 3-halo-cyclopentene, 3 - halo-cyclohexene, 3-halo-pentadiene-1,4, and the like, and their homologues and analogues.

The above unsaturated organic compounds may be treated individually or as mixtures with each other or with the corresponding or other saturated organic compounds. In this connection, it was discovered that when a mixture of unsaturated and saturated organic compounds, for example a butane-butylene mixture, is chlorinated or brominated according to the process of the present invention, the chlorine or bromine liberated from the herein described composite reagent capable of yielding the same, adds via addition to the unsaturated organic compound, while the saturated compound remains substantially, if not wholly, unaffected. In other words, according to the present process, it is possible to selectively halogenate the unsaturates via addition, the saturated compounds, if at all, acting as diluents.

The chlorination or bromination of the above-defined unsaturated compounds is effected, according to the process of the invention, with the aid of chlorides or bromides, respectively, of certain metals possessing variable valencies, these metal halides being employed in conjunction with certain carriers found to be particularly adapted for the purpose. Thus, the chlorination or bromination is effected by contacting the defined unsaturated organic compounds, under halo-addition-promoting conditions, with chlorine or bromine yielding compositions of matter or composite reagents predominating in or consisting of certain aluminas and certain metal chlorides or bromides which possess variable valencies, these halides being employed in a state above the minimum valence inherent thereto. Also, as will be described hereinbelow, these composite reagents may contain alkali metal chlorides and/or alkali metal bromides, the presence of which improves the yield of the desired products of addition, and also further inhibits the formation of products of substitution.

The type of alumina which was found to produce exceptionally desirable chlorination and/or bromination of the defined unsaturates, when combined with the corresponding halide of the aforementioned and hereinbelow more fully described metals (these halides being employed in the higher state of valence inherent to the particular metal), usually consists largely of alpha-alumina monohydrate and gamma-alumina in various proportions, this alumina being characterized by its highly active adsorptive properties. A particular example of this type of alumina is the "Activated Alumina of commerce."

The "Activated Alumina of commerce" is a well-known and readily available adsorptive alumina widely used for the adsorption of gases and vapors from gaseous mixtures. It is a specially prepared, hard, stony, crystalline, non-friable, highly adsorptive, partially hydrated form of aluminum trioxide designated as "Activated Alumina" because of its active adsorptive properties. For example, when contacted with moist gases, such as air, it removes water vapor with 100% efficiency until it has taken up between about 10% and about 15% of its dry weight. Beyond this point it continues to adsorb at decreasing efficiencies until it contains between about 20% and about 25% of adsorbed water. It is a special and distinct type of alumina, and should not be confused with various aluminas which have been made active catalytically and are thus said to have been "activated."

The "Activated Alumina of commerce" is at present produced from the hard crystalline scale which forms in the precipitation tanks and discharge pipes in the Fickes-Sherwin modification of the Bayer process. In this process sodium aluminate liquors containing particles of hydrated alumina in suspension are agitated in large tanks with the result that the sodium aluminate is decomposed and the aluminum precipitated as hydrated alumina. During the process, which is cyclic or continuous, deposits of a particularly hard form of a hydrated alumina form on the tank walls. These deposits are removed from time to time with pneumatic drills, broken up into pieces of the desired size and partially dehydrated by heating at a temperature of between about 300° C. and about 800° C., preferably in a current of an inert gas or under a vacuum. The preparation of this material is more fully described and claimed in U. S. Patents 1,868,869 and 2,015,593.

While the above-described commercial product known and sold under the name "Activated Alumina" is particularly suitable, it is, of course, to be understood that the alumina employed as the carrier of the metal halide used in the halogenation process of the present invention is not restricted to this particular product and that any partially hydrated alumina of this type having the characteristics of the "Activated Alumina of commerce" is applicable regardless of its method of preparation. For example, a suitable material having substantially the same characteristics as the "Activated Alumina of commerce" may be prepared by a very slow precipitation of aluminum trihydrate from an aqueous solution of sodium aluminate by passing therethrough a very slow stream of gaseous carbon dioxide, and subsequently carefully drying and heating the crystalline precipitate in air at about 600° C., or by the method described in German Patent 405,238. A similarly suitable carrier material may also be prepared from hydrargillite by acid washing and careful heating. Hydrargillite is a crustaceous or stalactitic crystalline form of hydrated alumina which occurs in small quantities as grains, nodules and irregular pockets in limestone and dolomite. Another suitable material may also be formed by treating aluminum amalgam under water and calcining the resulting fibrous precipitate. The term "Activated Alumina," as used hereinafter and in the claims, embraces all such aluminas possessing the physical structure and surface characteristics of the above-described products, while the term "Activated Alumina of commerce" refers to that material produced under the processes disclosed and/or claimed in U. S. Patents 1,868,869 and/or 2,015,593.

The material which, according to one phase of the present invention, is incorporated in the surface of the "Activated Alumina" to result in the composition of matter or composite reagent which yields chlorine or bromine atoms, is a metal chloride or bromide possessing a variable valence, these halides being used in a state of valence above the minimum inherent thereto and thus being capable of yielding the halogen while being reduced to a lower valence. These metal halides may or may not be in chemical combination with the surface of the "Activated Alumina." The chlorides and bromides of the following metals, all of which possess variable valencies, may be used: scandium, titanium, vanadium, chromium, manganese, iron, cobalt, copper, molybdenum, tungsten and uranium. These metals belong to the first transition series and/or the left hand group of the 6th period of the periodic table. The metal chlorides or bromides of metals of the first transition series of the periodic table which possess a variable valence, when employed in connection with "Activated Alumina," have been found to be highly suitable as the source of chlorine or bromine for the halo-addition according to the present invention. Although nickel and zinc, according to some writers, are also members of the first transition series of the periodic table, these metals are not included in the above list because zinc does not possess a variable valence, while nickel forms only one stable series of halide salts. The use of the chlorides and/or bromides of the above metals in a state of valence above the minimum inherent thereto permits the halide to be reduced to a metal halide of a lower valence and thus to yield its halogen or halogens to the unsaturated organic compound to be treated. For example, when cupric chloride is incorporated in the surface of the "Activated Alumina," this composition or composite reagent, when reacted with an olefin under the operating conditions described herein, yields free chlorine atoms to the olefin, the cupric chloride being at the same time reduced to cuprous chloride. Similarly, vanadium chlorides in their higher states of oxidation, e. g. vanadium tetrachloride and/or vanadium trichloride, may be used, these metal chlorides being reduced to vanadium dichloride. Of the above group of metal halides, the chlorides and bromides of the aforementioned metals of the first transition series, and particularly of copper and iron, have been found to give very good results when employed in connection with "Activated Alumina" as the source of the halogen for the halogenation via addition of unsaturates according to the present invention. Instead of using these metal halides individually, mixtures of two or more thereof may be employed in connection with "Activated Alumina."

The incorporation of the metal chloride or bromide in the surface of the "Activated Alumina" may be effected in a variety of suitable manners. A convenient method comprises impregnating the "Activated Alumina," employed in the form of granules, pellets, finely divided particles, etc., with a solution, preferably an aqueous solution, of the chloride or bromide of the metal, and then drying the mixture at the desired temperature. A convenient procedure comprises heating the "Activated Alumina" under a reduced pressure to a temperature of about 300° C. to remove air from the pores thereof, cooling the material and then adding the impregnating solution under reduced pressure. If desired, impregnation of the "Activated Alumina" may be accomplished by covering it with the impregnating solution, followed by alternate boiling and cooling. The resultant mixture may also be simply allowed to stand for a sufficient period of time. The concentration of the impregnating solution used in each particular case will depend upon the desired concentration thereof in the final composition of matter, as well as on other variables, such as solubility in the particular solvent, etc. The procedure to be followed in drying or treating the impregnated material may also vary, although generally the material may be dried at temperatures as high as 800° C., and even higher, this drying being effected in air or with inert gases, such as nitrogen. The drying temperature should, in general, be below the melting point of the metal halide or halides employed. Another method of producing the composite reagent used as the chlorine or bromine source in the present invention includes the incorporation of the metal chloride or bromide in its lower state of valence in the "Activated Alumina," followed by the oxidation of such metal halide to its higher valence for example by contacting the mass at a suitably elevated temperature with hydrogen chloride or hydrogen bromide in the presence of oxygen, air or another oxygen-yielding or oxygen-containing gas. In fact, as will be brought out below, this is the preferred method of regenerating the reduced composition of matter after it has been employed in the present process for the halogenation of the unsaturated compounds. Still other suitable modes of preparing the specified metal chloride- or bromide-containing "Activated Alumina" will be apparent to those skilled in the art. Conditions of preparation, however, should be such that the essential physical structure and surface characteristics possessed by the "Activated Alumina" are not materially altered.

The invention is not restricted to the use of compounds or composite reagents containing any specific amount of the active metal chloride or bromide. The optimum concentration of this metal halide in the compound reagent will generally depend upon the particular method of operation employed, the unsaturated organic compound to be halogenated, and the temperature, space velocity, etc., under which the chlorination or bromination is to be effected. It is preferable to use compound reagents wherein the "Activated Alumina" is in gravimetric excess of the active metal halide. Good results have been obtained by employing composite reagents containing from about 1% to about 40% by weight of the above described metal halide, although higher or lower concentrations may be used when necessary or desirable. A preferred range is from about 10% to about 20% by weight, these percentages varying at least somewhat with the specific metal chloride or bromide, or mixtures thereof, employed.

A particularly suitable compound reagent which may be employed for the halogenation (i. e. chlorination or bromination) of the unsaturates comprises or consists of "Activated Alumina" impregnated with the above-described metal halide, e. g. cupric chloride, and the chloride or bromide of an alkali metal. Although it is possible to use the halides of any one of the alkali metals, namely, lithium, sodium, potassium, rubidium or caesium, in most cases it is preferable to use the respective halide of sodium. The presence of these halides in the compound reagent further inhibits the formation of undesirable products of halo-substitution. The concentration of the alkali metal halides in the novel composition of matter suitable for the halogenation of unsaturates according to the present process may vary within relatively wide limits, and depends in part on the particular "Activated Alumina" used. For example, although it is possible to employ compositions comprising "Activated Alumina of commerce" and about 15% by weight of cupric chloride and as high as 10% by weight of sodium chloride, it is generally preferred to use such compositions of matter containing somewhat lower percentages of the alkali metal halide, excellent results having been obtained with composite reagents having between about 1% and about 5% to 6% of the alkali metal halide. Although in most cases it is preferable to employ the same halogens in the metal halide having a variable valence and in the alkali metal halide, any one of the halogens may be used in the preparation of the alkali metal halide which is incorporated into the novel composition of matter employed as the preferred composite reagent yielding chlorine or bromine atoms when reacted with unsaturated organic compounds according to the hereinbelow described process of the present invention.

Although the specified unsaturated organic compounds may be chlorinated or brominated by using any of the defined composite reagents containing one or more vari-valent metal chlorides or bromides incorporated in the "Activated Alumina," the present invention will be described herein with particular reference to the chlorination of olefins, e. g. butene-2, by means of a composition of matter consisting of "Activated Alumina" impregnated with cupric chloride. The halo-addition reaction according to the present process may be effected in a plurality of ways. For example, a desired quantity of the aforementioned composite reagent (e. g. comprising cupric chloride and "Activated Alumina of commerce") in the form of particles, granules, chips, pellets, etc., of the desired size and shape, may be packed into a reaction tube or chamber of any suitable material or capacity. Thereafter, a mixture comprising or containing the olefin, hydrogen chloride and an oxygen-containing gas (or pure oxygen) may be conveyed through the reaction chamber. In order to initiate the chlor-addition reaction, it is preferable to initially preheat the reactants. However, due to the fact that the reaction is exothermic, no heating is necessary once the reaction has started. In fact, in order to prevent excessive temperatures which may cause olefin decomposition, it is generally preferable to cool the reaction zone during such chlorination step. When the chlorination is effected in this manner, the cupric chloride-containing composition of matter may or may not be considered as a catalyst. For instance, it may be assumed that the cupric chloride is reduced to cuprous chloride, thus yielding a part of its chlorine to the butylene according to the general formula $C_4H_8+2CuCl_2 \rightarrow C_4H_8Cl_2+Cu_2Cl_2$. At the same time, it may be considered that the cuprous chloride thus formed is being simultaneously oxidized back to cupric chloride according to the equation $2HCl+\frac{1}{2}O_2+Cu_2Cl_2 \rightarrow 2CuCl_2+H_2O$. On the other hand, it may be assumed that the cupric chloride (or a similar vari-valent metal chloride or bromide) employed in conjunction with the "Activated Alumina," merely acts as a catalyst to convert the hydrogen chloride or bromide to the corresponding free halogen according to the reaction: $4HCl+O_2 \rightarrow 2Cl_2+2H_2O$, the halogen thus formed adding to the unsaturate treated. Irrespective of any theory of the case, the fact remains that unsaturates of the defined class may be chlorinated or brominated via addition by effecting the reaction according to the described process.

The above described process is quite valuable for the chlorination or bromination, via addition, of the defined class of unsaturates. However, this method of operation has certain disadvantages. For example, if air is used as the oxidizing agent, the recovery of the halogenated products and of the unreacted butylene from the vent gases containing high percentages of nitrogen, is quite costly and cumbersome. On the other hand, oxygen is more expensive and its use increases explosion dangers. These and other difficulties may be overcome by effecting the reaction in two stages, in the first of which the butylene (or another unsaturate) is chlorinated with the resultant reduction of the cupric chloride, or the like, to a halide of a lower state of valence, while the regeneration (oxidation) of the latter is effected in a second stage. Since oxygen, air, and the like, are absent during the period of time when the unsaturate is being reacted with the defined metal chloride or bromide, there is no danger of an explosion, nor any possibility for the oxidation or decomposition of the unsaturated organic compound treated. Also, in the two stage process, air or other oxygen-containing gases may be employed for converting the vari-valent metal halide to a higher state of valence without in any way complicating the recovery of the desired reaction products. Furthermore, the reaction involving the oxidation of cuprous chloride to cupric chloride, or the oxidation of another vari-valent metal halide, with a hydrogen halide and oxygen is a strongly exothermic reaction (about 52 kg. cal, in the case of cuprous chloride), while the chlorination of butylene with cupric chloride is only mildly exothermic (about 2 kg. cal.). Therefore, the effecting of the two reactions in separate stages is advantageous since the olefins may be chlorinated or brominated at very uniform temperatures throughout the reaction zone without the necessity of employing complicated cooling systems. The uniform temperatures increase the yield of the desired products of chlor-addition.

When effecting the chlorination or bromination by the outlined two-stage method, each cycle of operation includes a period during which the unsaturates are contacted with the described activated composite reagent which yields the chlorine or bromine to the unsaturates treated, and a period in which the metal halide thus reduced to its lower state of valence is regenerated preferably by reacting the "Activated Alumina" containing such reduced vari-valent metal halide with the respective hydrogen halide and oxygen. The duration of each of these periods will vary depending on a number of conditions. For instance, the period of time during which the halogenation of the unsaturate occurs will generally depend on such variables as the amount of the vari-valent metal chloride or bromide present on the "Activated Alumina," the specific character of the latter, particular unsaturate treated, degree of desired reduction of the metal halide per period, presence or absence of alkali metal halide in the reagent, nature thereof, etc. The same is true of the oxidizing step, the length of each period of this step depending on such conditions as the reaction temperature, degree of oxidation desired, presence or absence of inert gases, such as nitrogen, and the like.

When the chlorination or bromination of the unsaturates according to the present process is effected by contacting the unsaturated organic compound with a stationary mass of a solid composite reagent comprising "Activated Alumina" containing the vari-valent metal chloride or bromide incorporated therein, the rate of throughput of the unsaturated compound through such reagent may also vary within relatively wide limits, depending on a number of conditions, such as the presence or absence of diluents, content of the metal halide in the composite reagent, etc. It was noted above that saturated organic compounds and particularly the corresponding saturated hydrocarbon, may be employed as the diluent since under the operating conditions it remains inert and does not react to any substantial or noticeable degree with the chlorine or bromine liberated by the solid composite reagent. Other inert diluents, such as steam, may also be used. Furthermore, when the reaction is effected according to the described two stage process, it may be advantageous to convey steam through the composite reagent before and after each passage of the unsaturated organic compound. The conveyance of steam with or without oxygen or an oxygen-containing gas after the oxidation step, i. e. the step during which the reduced vari-valent metal halide is oxidized to a higher state of valence, completes the oxidation step and at the same time removes any excess hydrogen halide which may be present in the interstices of the "Activated Alumina." This decreases side reactions such as those caused by the addition of the hydrogen halide to the unsaturates subsequently conveyed over or through the composite reagent. The conveyance of steam or another inert gas through the "Activated Alumina" after the stage in which the unsaturate is contacted therewith drives off the obtained reaction products and thus affords better means for recovering higher yields of the desired product of halogen addition.

The operating temperature will vary depending on the specific metal chloride or bromide employed, the nature of the "Activated Alumina" used, the concentration of the metal chloride or bromide, the specific unsaturated organic compound or unsaturated hydrocarbon treated, etc. As a general rule, this temperature must be such that the unsaturate treated is in the vapor phase. When operating with the composite reagent described herein, the reaction temperature necessary is considerably lower than that essential for the chlorination or bromination with the corresponding metal halide deposited on other types of carriers such as pumice, pipe clay, and the like. For example, when butylene is to be chlorinated by addition by reacting it with cupric chloride deposited on "Activated Alumina," the reaction temperature may be maintained as low as 150° C., whereas yields even approaching those obtained with "Activated Alumina" cannot be attained at temperatures as high as 300° C. when cupric chloride is deposited on pumice. However, the reaction according to the present process may be effected at such high temperatures. The optimum reaction temperatures, as well as other optimum operating conditions, will be apparent to any skilled chemist. As to pressures, it is possible to effect the reaction at substantially atmospheric pressure, although higher and lower pressures may also be employed.

The invention will be illustrated by the following specific examples, it being understood that there is no intention of being limited by any specific details thereof, since many variations may be made.

*Example I*

The reactor consisted of a Pyrex glass tube 4.4 cm. in diameter and 51 cm. in length, this tube being heated externally to a temperature of about 150° C., by means of an aluminum block which surrounded the reaction tube. The tube was packed with ⅛ inch pellets of "Activated Alumina" having a high gamma alumina content, this alumina having been previously impregnated with a solution of cupric chloride and sodium chloride, and thereafter dried so that the pellets contained approximately 14.4% by weight of cupric chloride and approximately 5.6% by weight of sodium chloride. This novel composition of matter was employed for the chlorination of butylene (butene-2), the chlorination of the butylene and the reactivation of the cupric chloride being effected in separate stages. Each cycle of operation included a period during which the reduced copper chloride was oxidized to its highest stage of valence by reaction with oxygen and hydrogen chloride, and a period in which the chlorination of the butylene occurred. Specifically, the cycle consisted of the following four steps or stages:

(1) A 16-minute period during which a mixture consisting of 0.031 mol of hydrogen chloride, 0.104 mol of steam and 0.068 mol of air, was passed per minute over the pellets. During this period of time the temperature rose from 150° C. to about 206° C.;

(2) A 34-minute period during which a vaporous mixture consisting of 0.16 mol of steam and 0.068 mol of air per minute was passed to complete the oxidation, lower the temperature back to about 150° C., and drive off any unreacted hydrogen chloride present in the pellets;

(3) A 20-minute period during which a vaporous mixture of 0.05 mol of butylene and 0.16 mol of steam per minute was conveyed over the activated reagent; and (4) A 10-minute period during which steam was passed through the tube at the rate of 0.16 mol per minute to drive off all of the butylene and butylene chloride (dichlorbutane) still remaining in the reaction zone.

The above cycle was repeated 24 times and the products from the third and fourth stages of each of the cycles were collected together and analyzed by fractionation. The yield of products was as follows:

| | Yield based on— | | |
|---|---|---|---|
| | HCl applied | HCl consumed | Butylene consumed |
| | Per cent | Per cent | Per cent |
| Monochloride | 2.3 | 2.5 | 4.5 |
| Dichloride | 73.3 | 82.4 | 72.8 |
| Higher chlorides | 2.9 | 3.3 | 2.0 |
| Recovered unreacted | 11.0 | | |
| Losses | 10.5 | 11.8 | 20.7 |

*Example II*

This run was effected in the same apparatus and under the same conditions as those described in Example I, with the exception that the first stage of each cycle was continued for a period of 20 minutes instead of 16 minutes, and that a total of 0.604 mol of hydrogen chloride was introduced during each such cycle. As in the previous example, the products of the third and fourth stages of each cycle were collected together and analyzed by fractionation, the yield, calculated on the hydrogen chloride applied and consumed, being as follows:

|  | Yield based on— | |
|---|---|---|
|  | HCl applied | HCl consumed |
|  | Per cent | Per cent |
| Monochloride | 6.0 | 7.7 |
| Dichloride | 66.5 | 84.9 |
| Higher chlorides | 6.0 | 7.7 |
| Recovered unreacted | 21.5 |  |

Although the yield of product of side reactions increased somewhat as compared to those obtained when effecting the reaction under the conditions described in Example I, the yield of the desired butylene dichloride (dichlorbutane) increased both as calculated on the basis of hydrogen chloride consumed and on the basis of the butylene applied.

Example III

The reactor employed in the previous examples was used, but the tube was packed with an "Activated Alumina" predominating in alpha-alumina monohydrate and in gamma alumina, and containing approximately 19.3% of cupric chloride deposited thereon. The composite reagent was in the form of particles which passed through a 4-mesh screen but were retained on an 8-mesh screen. Each cycle of operations consisted of four stages. During the first stage of 20 minutes, a vaporous mixture of 0.031 mol of hydrogen chloride, 0.104 mol of steam and 0.068 mol of air per minute was conveyed through the tube. The second stage continued for 30 minutes, during which time a mixture of 0.068 mol of air and 0.16 mol of steam per minute was passed. During the third stage of ten minutes duration a vaporous mixture of 0.05 mol of butylene and 0.016 mol of steam per minute was conveyed over the cupric chloride-containing reagent, while during the fourth stage (which was also ten minutes in length) steam at a rate of 0.16 mol per minute was conveyed through the tube to drive off the vaporous reactants and reaction products. The temperature of the aluminum block surrounding the reactor was maintained at 150° C. but during the first stage of each cycle the temperature of the "Activated Alumina" rose to about 194° C. The products from twelve complete cycles were collected and analyzed by fractionation. The yield of dichlorbutane (based on the hydrogen chloride consumed) was equal to about 89.1%, the balance consisting of some monochlorides obtained by chlor-substitution, as well as some higher chlorides.

Example IV

In this experiment the reactor employed in the previous examples was packed with 4–8 mesh "Activated Alumina of commerce," which contained 14.0% cupric chloride and 4.0% sodium chloride by weight. Each cycle consisted of four stages. During the first stage, lasting 15 minutes, a mixture of 0.0277 mol hydrogen chloride, 0.0965 mol of steam and 0.085 mol of air per minute was conveyed through the tube. During this period of time the temperature in the tube rose from the block temperature of about 150° C.–160° C. to a temperature of 190° C.–250° C. During the second stage, which was of five minutes duration, a mixture of 0.145 mol of steam and 0.049 mol of air per minute was conveyed to complete the oxidation of the cupric chloride and the elimination of unreacted hydrogen chloride from the interstices. The third stage, which was the chlorination step, was 20 minutes long, and a mixture consisting of 0.0485 mol of butylene and 0.145 mol of steam per minute was conveyed through the reactor. In the fourth step, which was the purging stage, steam at the rate of 0.0278 mol per minute was conveyed for a period of 30 minutes. The product obtained from five complete cycles was collected and fractionated, the yield of the products being as follows:

|  | Yield based on— | | | |
|---|---|---|---|---|
|  | HCl applied | HCl consumed | Butylene | |
|  |  |  | Applied | Consumed |
|  | Per cent | Per cent | Per cent | Per cent |
| Monochloride | 3.8 | 4.1 | 6.6 | 7.1 |
| Dichloride | 65.3 | 70.0 | 56.0 | 60.0 |
| Higher chlorides | 4.0 | 4.3 | 2.2 | 2.4 |
| Recovered unreacted | 6.8 |  | 6.7 |  |
| Losses | 20.1 | 21.6 | 28.5 | 30.5 |

Example V

The tube of the reactor employed in the previous example was packed with granules of "Activated Alumina" of commerce which had been previously treated so as to contain approximately 17.3% by weight of cupric chloride. No sodium chloride was added to this composition. The reactor was maintained in an aluminum block, the temperature of which was between about 150° C. and about 160° C. Each cycle of operations consisted of four phases or stages: In the first, a vaporous mixture consisting of 0.831 mol of hydrogen chloride, 2.895 mols of steam and 1.485 mols of air was gradually conveyed through the tube over a period of 30 minutes. The second stage was five minutes long, during which a mixture of 0.725 mol of steam and 0.25 mol of air was passed through the reactor. During the third stage (which was used to cool the solid composite reagent from a temperature of about 320° C. back to the block temperature), steam was conveyed for a period of 45 minutes at the rate of 0.278 mol per minute. The chlorination stage was 20 minutes in length, and a vaporous mixture of 0.97 mol of butylene and 2.9 mols of steam was used in this stage of each cycle.

During ten complete cycles, the average amount of chlorinated products formed per cycle was equal to about 13 cc. as compared to between about 20 cc. and 25 cc. formed when sodium chloride was also present in the solid reagent in the reaction tube. The product also contained comparatively larger amounts of secondary butyl chloride as well as of crystals of chlorinated butanes containing more than two chlorine atoms per molecule.

Example VI

The apparatus employed in the previous examples was packed with ⅛ inch pellets consisting of an "Activated Alumina" (having a high gamma alumina content), about 13.9% of cupric chloride and about 6.1% of sodium chloride. The block temperature was maintained at between about 135° C. and about 140° C. A vaporous mixture consisting of butylene, air, hydrogen chloride and steam was simultaneously conveyed through the reaction zone in the following proportions:

| | Mols per minute |
|---|---|
| Butylene | 0.0285 |
| Air | 0.0365 |
| Hydrogen chloride | 0.015 |
| Steam | 0.50 |

The maximum reaction temperature was between about 190° C. and about 200° C. Approximately 78.5% of the hydrogen chloride and about 25.8% of the butylene reacted per pass. The yield of products, based on the hydrogen chloride consumed, was as follows:

| | Per cent |
|---|---|
| Monochloride | 3.36 |
| Dichloride | 88.50 |
| Higher chlorides | 2.22 |
| Losses | 5.92 |

The recovered yield of butylene dichloride was equal to about 68.50%, as based on the butylene consumed. However, the actual yield was higher since a considerable amount was not recovered from the exit gases due to insufficient refrigeration and faulty equipment.

*Example VII*

In order to show the marked advantages obtainable from the use of the solid composite reagent described herein, as compared to the results produced by employing previously known reagents, an experiment was conducted in the same manner as that disclosed in Example II with the exception that the cupric chloride was deposited on pumice instead of the "Activated Alumina" employed in the previous example. The stages of the cycles were the same in both runs. However, in order to obtain the desired dichlorbutane, the chlorination step had to be effected at a temperature of about 300° C. The reaction products were analyzed and gave the following yields:

| | Yield based on— | |
|---|---|---|
| | HCl consumed | Butylene consumed |
| | Per cent | Per cent |
| Monochloride | 4.93 | 7.88 |
| Dichloride | 66.37 | 53.05 |
| Higher chlorides | 15.66 | 10.80 |
| Losses | 13.04 | 28.27 |

A comparison of the yields in the two examples clearly shows the marked advantages attained by using "Activated Alumina." Thus, the yields of dichlorbutane (at the considerably lower temperatures employed in Example II) were markedly higher, while the yield of highly chlorinated products was much lower.

Although the above examples disclose the invention with particular reference to the chlorination of butylene by using "Activated Alumina" containing cupric chloride (with and without the addition of sodium chloride), other unsaturated organic compounds may be similarly chlorinated or brominated by reacting them with "Activated Alumina" impregnated with the vari-valent metal chlorides or bromides described more fully hereinabove. Also, instead of using a stationary bed of the solid composite reagent, the process may be realized by employing the composite reagent in a finely divided state and by passing it concurrently with or counter-currently to the other reactants.

I claim as my invention:

1. A process for chlorinating butene-2 via addition which comprises contacting butene-2 in a vapor state and at a temperature of about 150° C. with a solid reagent comprising an effective amount of cupric chloride and "Activated Alumina."

2. A process for chlorinating butene-2 via addition which comprises contacting butene-2 in a vapor state and at a temperature of about 150° C. with a solid reagent comprising an effective amount of cupric chloride, sodium chloride and "Activated Alumina."

3. A process for chlorinating butene-2 via addition which comprises disposing in a reaction zone a solid reagent comprising an "Activated Alumina," between about 10% and 20% of cupric chloride and between about 1% and about 6% sodium chloride, conveying vaporous butene-2 in contact with said reagent at a temperature of about 150° C., thereby chlorinating the butylene to dichlorbutane and simultaneously reducing the cupric chloride to couprous chloride, and periodically interrupting the conveyance of the butylene for the purpose of regenerating the copper chloride of the solid reagent, said regeneration being effected by reacting the reduced reagent with hydrogen chloride and oxygen under conditions such that the cuprous chloride of said reagent is oxidized to cupric chloride.

4. The process according to claim 3, wherein the chlorination of the butylene in the reaction zone is effected in the presence of a diluent which is substantially inert to chlorine under the operating conditions.

5. A process for chlorinating butylenes which comprises contacting a vaporous mixture containing butylene, hydrogen chloride and oxygen with a solid reagent comprising an effective amount of cupric chloride and an "Activated Alumina" at a temperature at which chlorination via addition of the butylene occurs.

6. A process for chlorinating butylenes via addition which comprises contacting butylene in a vapor state and at a temperature at which chlor-addition occurs, with a solid reagent comprising an "Activated Alumina," an effective amount of cupric chloride and an alkali metal chloride.

7. A process for halogenating butylenes via addition which comprises contacting a butylene in a vapor state and at a temperature at which halogen addition takes place with a reagent comprising an "Activated Alumina" and an effective amount of a solid metal halide of a metal of variable valence, said metal halide being in a state above the minimum valence inherent thereto, and the halogen of said metal halide having an atomic weight of between about 35 and about 80.

8. A process for halogenating butylenes via addition which comprises contacting a butylene in a vapor state and at elevated temperatures at which halogen addition takes place, with a reagent comprising an "Activated Alumina," between about 1% and 6% by weight of an alkali metal halide and between about 1% and about 40% by weight of a solid metal halide of a metal of variable valence, said metal halide being in a state above the minimum valence inherent thereto, and the halogen of said metal halide having an atomic weight of between about 35 and about 80.

9. A process for halogenating unsaturated organic compounds via addition which comprises contacting an unsaturated compound selected from the class consisting of hydrocarbons having an unsaturated linkage of aliphatic character and partially halogenated unsaturated derivatives thereof, in a vapor phase and at elevated temperatures at which halogen addition takes place, with a reagent comprising "Activated Alumina" and an effective amount of cupric chloride, whereby the cupric chloride is reduced to cuprous chloride and the chlorine thus liberated is added to the unsaturated linkage of the organic compound treated.

10. The process according to claim 9, wherein the reagent comprising the "Activated Alumina" and cupric chloride also contains an effective amount of sodium chloride.

11. A process of forming products of halo-addition which comprises contacting an unsaturated compound selected from the class consisting of hydrocarbons having an unsaturated linkage of aliphatic character and partially halogenated unsaturated derivatives thereof, in a vapor phase and at elevated temperatures at which halogen addition takes place, with a reagent comprising an adsorptive alumina predominating in gamma alumina and alpha-alumina monohydrate, and an effective amount of a solid metal halide of a metal of variable valence, said metal halides being employed in a state above the minimum valence inherent thereto and the halogens of said metal halides having an atomic weight of between about 35 and about 80, and periodically interrupting the contact of this reagent with the unsaturated organic compound to regenerate the reagent, said regeneration being effected by reacting the metal halide, which has been reduced to a lower state of valence, with oxygen and a hydrogen halide corresponding to the metal halide to be regenerated, under conditions such that the reduced metal halide of the treated reagent is oxidized to a metal halide having a higher valence.

12. A process of forming products of halo-addition which comprises contacting an unsaturated compound selected from the class consisting of hydrocarbons having an unsaturated linkage of aliphatic character and partially halogenated unsaturated derivatives thereof, in a vapor phase and at elevated temperatures at which halogen addition takes place, with a reagent comprising an adsorptive alumina predominating in gamma alumina and alpha-alumina monohydrate, and an effective amount of a solid metal halide of a metal of variable valence, said metal halide being in a state above the minimum valence inherent thereto, and the halogen of said metal halide having an atomic weight of between about 35 and about 80.

GEORGE W. HEARNE.